United States Patent
Yoshioka et al.

(10) Patent No.: US 11,343,055 B2
(45) Date of Patent: May 24, 2022

(54) USER TERMINAL AND RADIO COMMUNICATION METHOD FOR CONTROLLING CHANNEL STATE INFORMATION

(71) Applicant: NTT DOCOMO, INC., Tokyo (JP)

(72) Inventors: Shohei Yoshioka, Tokyo (JP); Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 23 days.

(21) Appl. No.: 16/766,968

(22) PCT Filed: Nov. 26, 2018

(86) PCT No.: PCT/JP2018/043393
§ 371 (c)(1),
(2) Date: May 26, 2020

(87) PCT Pub. No.: WO2019/103141
PCT Pub. Date: May 31, 2019

(65) Prior Publication Data
US 2021/0036835 A1    Feb. 4, 2021

(30) Foreign Application Priority Data

Nov. 27, 2017  (JP) .............. JP2017-239055

(51) Int. Cl.
*H04L 5/00*     (2006.01)
*H04W 76/11*    (2018.01)
(Continued)

(52) U.S. Cl.
CPC ......... *H04L 5/0098* (2013.01); *H04B 7/0626* (2013.01); *H04L 1/0061* (2013.01);
(Continued)

(58) Field of Classification Search
CPC .... H04L 5/0098; H04L 1/0061; H04W 76/11; H04W 72/0493; H04W 72/1289; H04B 7/0626
See application file for complete search history.

(56) References Cited

U.S. PATENT DOCUMENTS

2010/0118807 A1*  5/2010  Seo .............. H04W 72/042
                                                 370/329
2011/0249578 A1* 10/2011  Nayeb Nazar ...... H04W 24/10
                                                 370/252
(Continued)

OTHER PUBLICATIONS

International Search Report issued in PCT/JP2018/043393 dated Feb. 5, 2019 (1 page).
(Continued)

*Primary Examiner* — Jael M Ulysse
(74) *Attorney, Agent, or Firm* — Osha Bergman Watanabe & Burton LLP

(57) ABSTRACT

To appropriately control CSI reporting even when CSI reporting is performed by applying a method different from a method used in existing LTE systems. A user terminal includes: a receiving section that receives downlink control information indicating activation or deactivation of semi-persistent channel state information; and a control section that controls transmission of the semi-persistent channel state information by making an interpretation of a certain bit field included in the downlink control information based on an RNTI applied to a CRC of the downlink control information.

5 Claims, 10 Drawing Sheets

(51) Int. Cl.
  *H04B 7/06* (2006.01)
  *H04L 1/00* (2006.01)
  *H04W 72/04* (2009.01)
(52) U.S. Cl.
  CPC ..... *H04W 72/042* (2013.01); *H04W 72/0493* (2013.01); *H04W 76/11* (2018.02)

(56) References Cited

U.S. PATENT DOCUMENTS

| | | | | |
|---|---|---|---|---|
| 2012/0250558 | A1* | 10/2012 | Chung | H04B 7/0632 370/252 |
| 2014/0044072 | A1* | 2/2014 | Piggin | H04W 72/005 370/329 |
| 2014/0105164 | A1* | 4/2014 | Moulsley | H04W 72/1289 370/329 |
| 2014/0241319 | A1 | 8/2014 | Lee et al. | |
| 2014/0334355 | A1* | 11/2014 | Ekpenyong | H04W 72/0446 370/280 |
| 2018/0070369 | A1* | 3/2018 | Papasakellariou | H04W 72/0406 |
| 2018/0269939 | A1* | 9/2018 | Hu | H04W 74/0833 |
| 2018/0278314 | A1* | 9/2018 | Nam | H04W 72/042 |
| 2019/0074882 | A1* | 3/2019 | Zhou | H04B 7/0617 |
| 2019/0141546 | A1* | 5/2019 | Zhou | H04W 72/0453 |
| 2019/0141677 | A1* | 5/2019 | Harrison | H04L 5/0096 |
| 2020/0280357 | A1* | 9/2020 | Bae | H04L 1/0027 |

OTHER PUBLICATIONS

Written Opinion of the International Searching Authority issued in PCT/JP2018/043393 dated Feb. 5, 2019 (4 pages).
Ericsson; "On remaining details of CSI reporting"; 3GPP TSG-RAN WG1 #91, R1-1720734; Reno, USA; Nov. 27-Dec. 1, 2017 (10 pages).
Ericsson; "On semi-persistent CSI reporting on PUSCH"; 3GPP TSG-RAN WG1 #90bis, R1-1718442; Prague, Czech Republic; Oct. 9-13, 2017 (6 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in European Application No. 18880423.1, dated Jul. 30, 2021 (6 pages).
Office Action issued in Taiwanese Application No. 1071423224; dated Aug. 20, 2021 (12 pages).

* cited by examiner

USER TERMINAL AND RADIO COMMUNICATION METHOD FOR CONTROLLING CHANNEL STATE INFORMATION

TECHNICAL FIELD

The present invention relates to a user terminal and a radio communication method in next-generation mobile communication systems.

BACKGROUND ART

In UMTS (Universal Mobile Telecommunications System) networks, the specifications of Long Term Evolution (LTE) have been drafted for the purpose of further increasing high speed data rates, providing lower latency and so on (see Non-Patent Literature 1). Further, LTE-A (also referred to as LTE-Advanced, LTE Rel. 10, Rel. 11, or Rel. 12) has been drafted for the purpose of achieving a broader bandwidth and higher speed beyond LTE (also referred to as LTE Rel. 8 or Rel. 9), successor systems of LTE (also referred to as, for example, "FRA (Future Radio Access)," "5G (5th generation mobile communication system)," "5G+(plus)," "NR (New Radio)," "NX (New radio access)," "FX (Future generation radio access)," "LTE Rel. 13," "LTE Rel. 14," "LTE Rel. 15" (or later versions), and so on) are also under study.

In existing LTE systems (for example, LTE Rel. 8 to Rel. 13), an uplink signal is mapped to an appropriate radio resource to be transmitted from a UE to an eNB. Uplink user data is transmitted using an uplink shared channel (PUSCH (Physical Uplink Shared Channel)). Further, uplink control information (UCI) is transmitted using a PUSCH when the UCI is transmitted together with uplink user data, and is transmitted using an uplink control channel (PUCCH (Physical Uplink Control Channel)) when the UCI is transmitted by itself.

The UCI includes transmission confirmation information (ACK/NACK), a scheduling request, and channel state information (CSI) for a downlink shared channel (PDSCH (Physical Downlink Shared Channel)), for example. The transmission confirmation information may be referred to as an HARQ-ACK (Hybrid Automatic Repeat reQuest-Acknowledgement), an ACK/NACK (A/N), retransmission control information, and so on.

The CSI is information based on a downlink instantaneous channel state, and is, for example, a channel quality indicator (CQI), a precoding matrix indicator (PMI), a precoding type indicator (PTI), a rank indicator (RI), and so on. The CSI is notified from the UE to the eNB either periodically or aperiodically.

Periodic CSI (P-CSI) is such CSI that is periodically transmitted by the UE, based on periodicity and a resource that are notified from the radio base station. In contrast, aperiodic CSI (A-CSI) is such CSI that is transmitted by the UE, according to a CSI report request (also referred to as a trigger, a CSI trigger, a CSI request, and so on) that is from the radio base station.

The CSI trigger is included in an uplink scheduling grant (hereinafter also referred to as a UL (Uplink) grant) that is transmitted on a downlink control channel (PDCCH (Physical Downlink Control Channel)). In accordance with a CSI trigger included in a UL grant for scheduling uplink data, the UE gives a notification of A-CSI by using a PUSCH that is designated by the UL grant. Such notification is also referred to as A-CSI reporting.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, LTE Rel. 14, Rel. 15 or later versions, 5G, NR, and so on), control of CSI reporting using a configuration different from a configuration used in the existing LTE systems (for example, LTE Rel. 13 or earlier versions) is also under study.

For example, aperiodic CSI reporting performed by using an uplink control channel as well as an uplink shared channel is under study. In this case, how to control allocation of an uplink control channel to allocate aperiodic CSI presents a problem.

For example, one possible solution is to apply control similar to control of CSI reporting in the existing systems. In the existing systems, triggers of A-CSI reporting are controlled using a PUSCH that is designated by a UL grant for scheduling uplink data; however, designation of a resource of an uplink control channel using a UL grant is not assumed. As described above, when CSI reporting is performed by applying a method different from a method used in the existing LTE systems, directly applying the method of controlling CSI reporting of the existing LTE systems may be impractical.

The present invention is made under the circumstances as described above, and has one object to provide a user terminal and a radio communication method that can appropriately control CSI reporting even when CSI reporting is performed by applying a method different from a method used in existing LTE systems.

Solution to Problem

A user terminal according to one aspect of the present invention includes: a receiving section that receives downlink control information indicating activation or deactivation of semi-persistent channel state information; and a control section that controls transmission of the semi-persistent channel state information by making an interpretation of a certain bit field included in the downlink control information according to an RNTI applied to a CRC of the downlink control information.

Advantageous Effects of Invention

According to the present invention, CSI reporting can be appropriately controlled even when CSI reporting is performed by applying a method different from a method used in existing LTE systems.

DESCRIPTION OF EMBODIMENTS

In the existing LTE systems (Rel. 10 to Rel. 13), a reference signal for measuring a channel state in the downlink is defined. The reference signal for channel state measurement is also referred to as a CRS (Cell-specific Reference Signal) and a CSI-RS (Channel State Information-Reference Signal), and is a reference signal used to measure CSI as a channel state, such as a CQI (Channel Quality Indicator), a PMI (Precoding Matrix Indicator), and an RI (Rank Indicator).

A user terminal (UE) feeds results measured based on the reference signal for channel state measurement back to a radio base station as channel state information (CSI) at certain timing. As CSI feedback methods, periodic CSI reporting (P-CSI) and aperiodic CSI reporting (A-CSI) are defined.

When the UE performs aperiodic CSI reporting, the UE performs transmission of A-CSI according to a CSI trigger (CSI request) from the radio base station. For example, the UE performs A-CSI reporting after the elapse of certain timing (for example, four subframes) from reception of the CSI trigger.

Figure 1:
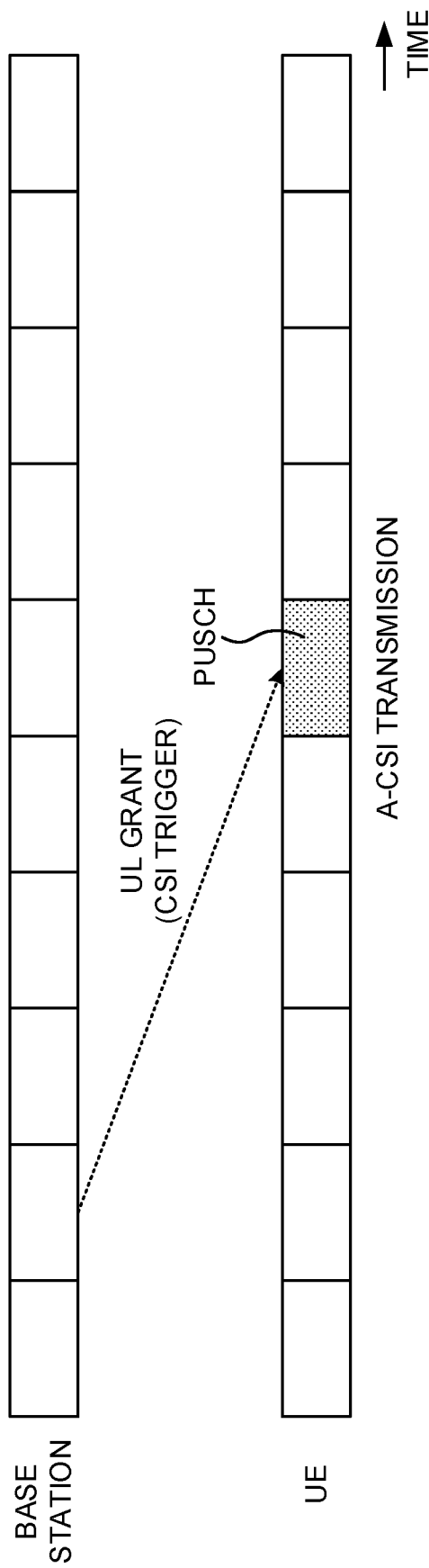
FIG. 1 is a diagram to show an example of transmission of A-CSI in existing systems.

The CSI trigger notified from the radio base station is included in downlink control information (for example, DCI format 0/4) for an uplink scheduling grant (UL grant) transmitted on a downlink control channel. The UE performs A-CSI transmission by using a PUSCH designated by the UL grant, according to the trigger included in the downlink control information for a UL grant for scheduling UL data (see FIG. 1). Further, when CA is applied, the user terminal can receive a UL grant (including an A-CSI trigger) for a certain cell on a downlink control channel of another cell.

Figure 2:
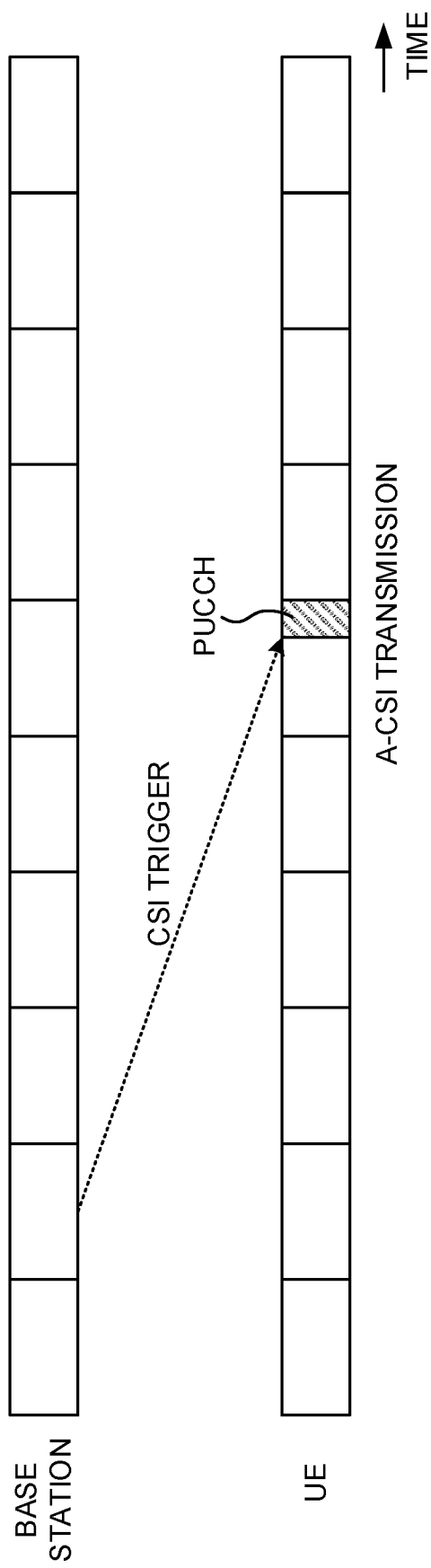
FIG. 2 is a diagram to show an example of A-CSI using a PUCCH.

Incidentally, for future radio communication systems (also referred to as 5G/NR), performance of CSI reporting in a configuration different from a configuration used in the existing LTE systems is under study. For example, performing A-CSI reporting by using a PUCCH as well as a PUSCH is under study (see FIG. 2). FIG. 2 shows a case in which A-CSI is transmitted by using a short PUCCH and/or a long PUCCH based on an indication (CSI trigger) from the base station.

The short PUCCH corresponds to a UL control channel that can use short duration compared to duration of a PUCCH format of the existing LTE systems (for example, LTE Rel. 8 to Rel. 13). Further, the long PUCCH corresponds to a UL control channel having long duration compared to the short duration of the short PUCCH. The short PUCCH includes a certain number of symbols (for example, one, two, or three symbols) in a certain sub-carrier spacing (SCS). In the short PUCCH, uplink control information and a reference signal may be multiplexed in time division multiplexing (TDM), or may be multiplexed in frequency division multiplexing (FDM). The RS may be, for example, a demodulation reference signal (DMRS) used to demodulate UCI. The short PUCCH may be configured in at least one symbol of each slot.

In contrast, the long PUCCH is mapped over a plurality of symbols in a slot in order to further enhance coverage and/or transmit a larger amount of UCI than the short PUCCH. For example, the long PUCCH may be configured using 7 symbols or 14 symbols. In the long PUCCH, UCI and an RS (for example, a DMRS) may be multiplexed in TDM, or may be multiplexed in FDM. In the long PUCCH, frequency hopping may be applied to each certain period (for example, mini-(sub-)slot) in a slot. When intra-slot frequency hopping is applied in a slot, it is preferable that a DMRS of one or two symbols be mapped in each hop.

The long PUCCH may include as many frequency resources as the short PUCCH, or may include less frequency resources (for example, one or two physical resource blocks (PRBs)) than the short PUCCH to achieve a power amplification effect. Further, the long PUCCH may be mapped in the same slot as the short PUCCH.

Note that when a plurality of PUCCH formats are supported, the short PUCCH may correspond to a certain PUCCH format (for example, PUCCH format 0 or 2), and the long PUCCH may correspond to another PUCCH format (for example, PUCCH format 1, 3, or 4).

Accepting (supporting) A-CSI using a PUCCH as described above allows for flexible control of CSI reporting and enhancement of quality of transmission and reception of A-CSI. In contrast, in the existing systems, A-CSI reporting is controlled using a PUSCH designated by a UL grant for scheduling uplink data, and designation of PUCCH resources using a UL grant is not assumed.

Accordingly, when A-CSI reporting using a PUCCH is supported as well as A-CSI reporting using a PUSCH, how the UE controls a UL channel used to perform transmission of A-CSI presents a problem.

The inventors of the present invention focused on that transmission indication of channel state information is performed using downlink control information, and came up with the idea of adopting a configuration in which an uplink channel to be used for transmission of channel state information is determined based on the downlink control information.

Embodiments according to the present invention will be described in detail with reference to the drawings as follows. A configuration illustrated in an aspect of each embodiment may be employed independently or may be employed in combination. Further, although the following description assumes an aperiodic CSI (A-CSI) trigger, the present embodiment is not limited to such a configuration. For example, the present embodiment is also applicable to a notification of activation and/or deactivation of CSI (for example, semi-persistent CSI). In this case, a "trigger of CSI" may be replaced with a "notification of activation and/or deactivation of CSI (for example, SP-CSI)".

Note that the SP-CSI implies a case in which CSI reporting is semi-persistently performed (SP-CSI (Semi-persistent CSI)). In SP-CSI reporting, at least one of a wide band, a partial band is used as frequency granularity, a long PUCCH and/or PUSCH is used as a physical channel, and type 1-CSI and/or partial type 2 CSI is used as a codebook. When CSI reporting is semi-persistently performed, configuration (for example, activation and/or deactivation) for the UE can be performed by using downlink control information and/or MAC control information (MAC CE).

(First Aspect)

The first aspect illustrates a case in which determination of a UL channel to be used for transmission of channel state information (CSI) is controlled based on downlink control information (DCI). The DCI may be DCI for triggering the CSI. Further, although the following description assumes a case in which an uplink shared channel (PUSCH) and a short PUCCH (sPUCCH) are used as UL channels, applicable UL channels are not limited to those described above. A short PUSCH or an uplink control channel (PUCCH) may be used for transmission of CSI.

When a CSI trigger is indicated from the base station, the UE determines a UL channel to be used for transmission of CSI, based on certain DCI. The certain DCI may be DCI for indicating a CSI trigger, or may be other DCI. Further, as the certain DCI, at least one of a UL grant for indicating UL transmission (UL data scheduling), a DL assignment for indicating DL transmission (DL data scheduling), and DCI for indicating a CSI trigger without scheduling data (also referred to as DCI for CSI trigger) can be used.

For example, the UE determines whether CSI transmission is performed on a PUSCH or an sPUCCH, based on a bit field included in certain DCI, an RNTI applied to certain DCI, and a size of certain DCI. Each of the cases using a bit field, an RNTI, and a DCI size will be described below.

<Bit Field>

When a CSI trigger is indicated, the UE determines an uplink channel to allocate CSI, based on a value of a specific bit field included in certain DCI. The specific bit field includes one bit or a plurality of bits.

Figure 3B:
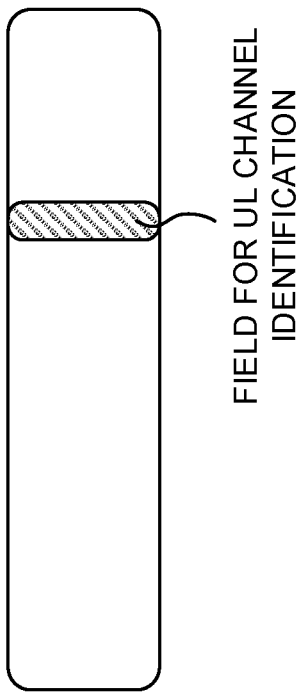
FIGS. 3A and 3B are each a diagram to show an example of DCI for triggering A-CSI.
Figure 3A:
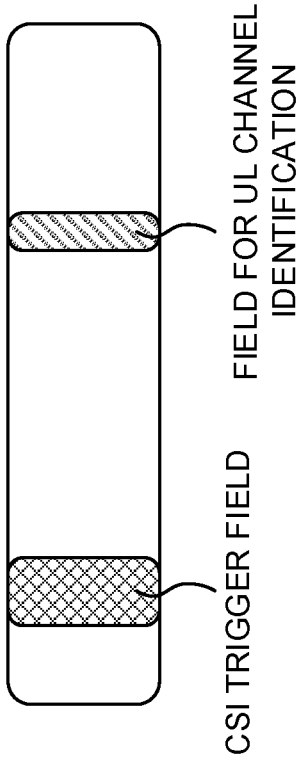

FIGS. 3A and 3B each show an example of DCI of a case in which a field (here, 1-bit field) designating an uplink channel is provided in DCI for indicating a CSI trigger. FIG. 3A shows a case in which a field for UL channel identification is provided in DCI (for example, a UL grant) for scheduling data. FIG. 3B shows a case in which a field for UL channel identification is provided in DCI for CSI trigger.

The DCI for data scheduling (a UL grant or a DL assignment) may include a CSI trigger field. In contrast, when the DCI for CSI trigger is supported, the DCI for CSI trigger may not include a CSI trigger field (see FIG. 3B).

For example, when a value of the field for UL channel identification in DCI for indicating a CSI trigger is "0", the UE performs CSI reporting (CSI transmission) by using the PUSCH. In contrast, when a value of the field for UL channel identification in DCI for indicating a CSI trigger is "1", the UE performs CSI reporting (CSI transmission) by using the sPUCCH.

Further, a combination candidate set of a UL channel and a transmission condition (transmission parameter) used for CSI reporting may be configured for (or notified to) the UE from the base station in advance, and a specific candidate set may be determined by using DCI. Information related to the candidate set may be configured for the UE from the base station in advance by means of higher layer signaling (for example, RRC signaling and so on). Further, bit information used for notification of the specific candidate set may be configured in a certain bit field of the DCI (for example, a field for UL channel identification and so on).

Further, the UE may control an interpretation of other bit fields included in the DCI, based on bit information of the field for UL channel identification. Examples of such other bit fields may include a resource allocation field (RA field) and/or a power control field (TPC field).

For example, when the field for UL channel identification indicates a PUSCH (when the field indicates "0"), the UE controls allocation of the PUSCH and/or the CSI, based on an RA field indicating resource allocation and included in the DCI (for example, a UL grant). In other words, when a CSI trigger using the PUSCH is indicated using DCI, the UE determines that a resource allocation field included in the DCI is a field for PUSCH transmission, and controls allocation of the CSI.

When the field for UL channel identification indicates a PUCCH (when the field indicates "1"), the UE controls allocation of the sPUCCH and/or the CSI, based on an RA field indicating resource allocation and included in the DCI (for example, a UL grant). In other words, when a CSI trigger using the PUCCH is indicated using DCI, the UE determines that a resource allocation field included in the DCI is a field for PUCCH transmission, and controls allocation of the CSI.

Alternatively, when the field for UL channel identification indicates a PUSCH (when the field indicates "0"), the UE applies information notified in a power control command (TPC) field to PUSCH transmission. In other words, when a CSI trigger using the PUSCH is indicated using DCI, the UE determines that a TPC field included in the DCI is a field for PUSCH transmission, and controls transmission power of the PUSCH to be used to transmit the CSI.

When the field for UL channel identification indicates a PUCCH (when the field indicates "1"), the UE applies information notified in a power control command (TPC) field to PUCCH transmission. In other words, when a CSI trigger using the PUCCH is indicated using DCI, the UE determines that a TPC field included in the DCI is a field for PUCCH transmission, and controls transmission power of the PUCCH to be used to transmit the CSI.

Further, when TPC command accumulation is applied, the UE may control TPC command accumulation, based on bit information of the field for UL channel identification. For example, when the field for UL channel identification indicates a PUSCH (when the field indicates "0"), the UE performs TPC command accumulation as TPC for the PUSCH. In contrast, when the field for UL channel identification indicates a PUCCH (when the field indicates "1"), the UE performs TPC command accumulation as TPC for the PUCCH.

In this manner, transmission power of each uplink channel can be flexibly controlled also in consideration of aperiodically transmitted CSI transmission. For example, when PUCCH transmission is performed after performing CSI transmission using the PUCCH, transmission power of the PUCCH transmission after the CSI transmission can be determined based on a communication environment by also accumulating TPC commands at the time of the CSI transmission.

In this manner, by giving a notification of an uplink channel to be used for CSI reporting with the use of a bit field included in certain DCI from the base station to the UE, an uplink channel to be used for CSI transmission can be flexibly changed and controlled for each CSI trigger.

Note that a DCI format size (payload size) of DCI for triggering CSI reporting using the PUSCH may be the same as a DCI format size of DCI for triggering CSI reporting using the PUCCH. In this manner, the same error correction code (for example, a polar code) can be applied to each piece of DCI. As a result, processing of transmission and reception processing can be simplified and increase of a processing load can be prevented.

Further, an RNTI used for masking a CRC of the DCI for triggering CSI reporting using the PUSCH and an RNTI used for masking a CRC of the DCI for triggering CSI reporting using the PUCCH may be the same. In this manner, the same RNTI can be applied to the pieces of DCI, and thus a load of transmission and reception processing can be prevented from increasing.

Further, either a search space of the DCI for triggering CSI reporting using the PUSCH or a search space of the DCI for triggering CSI reporting using the PUCCH may include the other. For example, the search space of the DCI for triggering CSI reporting using the PUSCH may be configured to be the same as the search space of the DCI for triggering CSI reporting using the PUCCH. Further, the search space of the DCI for triggering CSI reporting using the PUSCH may be configured to be a subset or a superset of the search space of the DCI for triggering CSI reporting using the PUCCH.

In this manner, by adopting the configuration in which either the search space of the DCI for triggering CSI reporting using the PUSCH or the search space of the DCI for triggering CSI reporting using the PUCCH includes the other, downlink control channel candidates (PDCCH candidates) corresponding to respective pieces of DCI may be configured in common. In this manner, a range that the UE monitors (detects) when the UE receives the pieces of DCI can be prevented from increasing.

<RNTI>

When a CSI trigger is indicated, the UE may determine an uplink channel to allocate CSI, based on an RNTI applied to certain DCI. For example, different RNTIs are applied to DCI for indicating a CSI trigger using the PUSCH and DCI for indicating a CSI trigger using the PUCCH.

In this case, the base station masks a CRC of the DCI for indicating a CSI trigger using the PUSCH by using a first RNTI (for example, a specific RNTI), and masks a CRC of the DCI for indicating a CSI trigger using the PUCCH by using a second RNTI. Information related to the first RNTI and/or the second RNTI may be configured for the UE from the base station by means of higher layer signaling (for example, RRC signaling and so on).

For example, when a CRC of received DCI is masked using the first RNTI, the UE performs CSI reporting (CSI transmission) by using the PUSCH. In contrast, when a CRC of received DCI is masked using the second RNTI, the UE performs CSI reporting (CSI transmission) by using the sPUCCH.

Further, the UE may control an interpretation of other bit fields included in the DCI, based on a type of an RNTI that is applied to the DCI (that is used to mask a CRC of the DCI). Examples of such other bit fields may include a resource allocation field (RA field) and/or a power control field (TPC field).

An interpretation method of other bit fields may be implemented in a similar manner to the above-described case in which an uplink channel is determined based on a bit field. For example, in the above description, the case in which the field for UL channel identification indicates a PUSCH (when the field indicates "0") corresponds to a case in which a CRC of DCI is masked using the first RNTI, and the case in which the field for UL channel identification indicates a PUCCH (when the field indicates "1") corresponds to a case in which a CRC of DCI is masked using the second RNTI.

In this manner, by determining an uplink channel to be used for CSI reporting with the use of an RNTI applied to DCI for indicating a CSI trigger, an uplink channel to be used for CSI transmission can be flexibly changed and controlled for each CSI trigger. Further, the use of an RNTI used for DCI allows for notification of an uplink channel to be used for CSI transmission without increasing the size of DCI (without providing a bit field).

When different RNTIs are applied to individual uplink channels to be used for CSI transmission, different configurations (for example, non-overlapping configurations) may be adopted for the search space of the DCI for triggering CSI reporting using the PUSCH and the search space of the DCI for triggering CSI reporting using the PUCCH. In this case, probability of blocking, which is a situation in which both the search spaces contend against each other for allocable resources and thus either of them is hindered from resource allocation, can be reduced.

Alternatively, when different RNTIs are applied to the DCI for triggering CSI reporting using the PUSCH and the DCI for triggering CSI reporting using the PUCCH, the same configuration may be adopted for the search spaces of the respective pieces of DCI (or a configuration in which either of the search spaces includes the other may be adopted). In this case, results of channel estimation and error correction decoding performed in a single blind detection can be used for blind detection for a plurality of pieces of DCI, and thus a load of terminal processing can be reduced.

<DCI Size>

When a CSI trigger is indicated, the UE may determine an uplink channel to allocate CSI, based on the size of certain DCI. For example, DCI for indicating CSI reporting using the PUSCH and DCI for indicating CSI reporting using the PUCCH are configured to have different sizes (payload sizes) (see FIG. 4).

The UE determine whether an uplink channel for performing CSI reporting is a PUSCH or a PUCCH, based on the size of received DCI.

Figure 4:
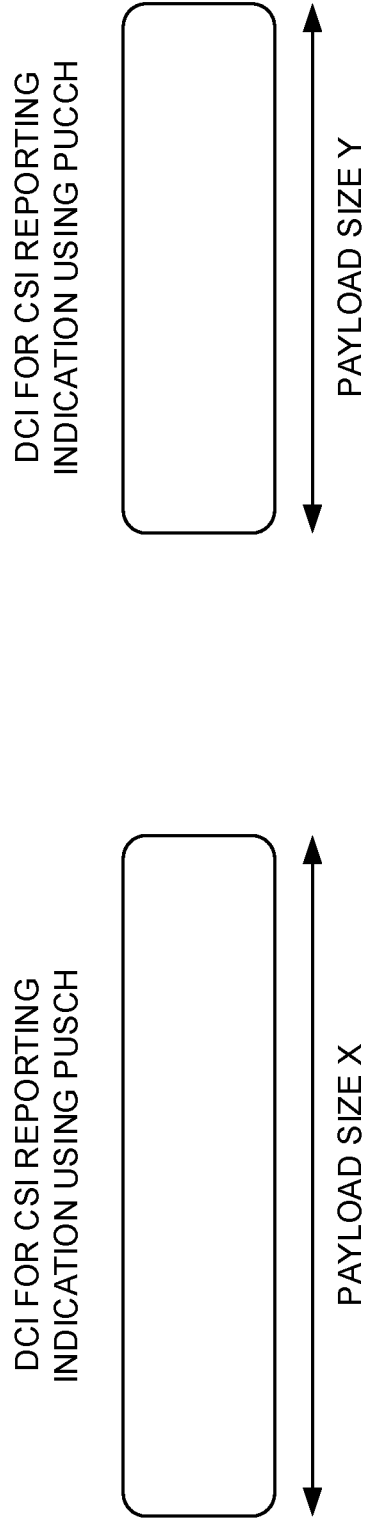
FIG. 4 is a diagram to show another example of DCI for triggering A-CSI.

For example, FIG. 4 shows a case in which the size of the DCI for indicating CSI reporting using the PUSCH is represented by "X" and the size of the DCI for indicating CSI reporting using the PUCCH is represented by "Y" (X>Y). The figure shows a case in which the size of the DCI for indicating CSI reporting using the PUSCH is larger than the size of the DCI for indicating CSI reporting using the PUCCH, but this is not restrictive (X and Y may be X<Y).

The DCI payload size is determined according to the number of bits of a bit field included in each piece of DCI. In some cases, the size of the DCI for indicating CSI reporting using the PUSCH and the size of the DCI for indicating CSI reporting using the PUCCH may be assumed to be the same as each other. In this case, certain bit(s) may be added to either piece of DCI so as to make a difference in the payload sizes. As the certain bit(s), a 1-bit padding bit corresponding to empty information may be used.

Further, the size of a certain field of DCI may be changed, instead of the size of the entire DCI. For example, a bit size of a certain field (for example, an RA field) included in the DCI for indicating CSI reporting using the PUSCH may be configured to be larger than a bit size of a certain field (for example, an RA field) included in the DCI for indicating CSI reporting using the PUCCH. In this case, the sizes of the entire DCI may also be different.

Further, the UE may control an interpretation of other bit fields included in the DCI, based on the size of the DCI (or the size of a certain field). Examples of such other bit fields may include a resource allocation field (RA field) and/or a power control field (TPC field).

An interpretation method of other bit fields may be implemented in a similar manner to the above-described case in which an uplink channel is determined based on a bit field. For example, in the above description, the case in which the field for UL channel identification indicates a PUSCH (when the field indicates "0") corresponds to a case in which the size of DCI is X, and the case in which the field for UL channel identification indicates a PUCCH (when the field indicates "1") corresponds to a case in which the size of DCI is Y.

Further, when different configurations are adopted for the size of the DCI for indicating CSI reporting using the PUSCH and the size of the DCI for indicating CSI reporting using the PUCCH, different error correction codes (for example, polar codes) may be applied to the respective pieces of DCI.

Further, an RNTI used for masking a CRC of the DCI for indicating CSI reporting using the PUSCH and an RNTI used for masking a CRC of the DCI for indicating CSI reporting using the PUCCH may be the same. In this manner, the same RNTI can be applied to the pieces of DCI, and thus a load of transmission and reception processing can be prevented from increasing.

Further, either a search space of the DCI for indicating CSI reporting using the PUSCH or a search space of the DCI for indicating CSI reporting using the PUCCH may include the other. For example, the search space of the pieces of DCI may be configured to be the same as the search space of the DCI for data scheduling. Further, the search space of either piece of DCI may be configured to be a subset or a superset of the search space of the other piece of DCI.

In this manner, by determining an uplink channel to be used for CSI reporting based on the size of DCI for indicating a CSI trigger, an uplink channel to be used for CSI transmission can be flexibly changed and controlled for each CSI trigger. Further, by adopting the configuration in which the DCI for indicating CSI reporting using the PUSCH and the DCI for indicating CSI reporting using the PUCCH have different sizes, the size of each piece of DCI can be flexibly configured according to a purpose of each piece of DCI.

(Variations)

The UE may simultaneously receive a plurality of A-CSI triggers in the same serving cell. For example, the base station may transmit, to a certain UE, DCI for indicating a plurality of times of CSI reporting (CSI triggers) in a certain time unit (a subframe, a slot, a mini-slot, or the like).

In this case, one of the plurality of triggers may be an A-CSI trigger using the PUSCH, and the other triggers may be A-CSI triggers using the short PUCCH. In this case, the UE controls any one of an uplink channel and a resource to be transmitted and transmission timing, based on notified DCI.

Further, the UE may perform CSI reporting by using different resources (for example, different UL channels) at the same timing or different timings, based on a plurality of CSI triggers. Note that a plurality of A-CSI triggers may be individually notified using a plurality of different pieces of DCI, or may be notified using one piece of DCI.

Permitting simultaneous transmission of indications of a plurality of times of CSI reporting to the UE as described above allows for flexible control of CSI reporting using a plurality of channels (for example, a PUSCH and an sPUCCH).

<DCI for CSI Reporting Indication>

As the DCI for indicating CSI reporting to the UE, DCI for data scheduling (a UL grant and/or a DL assignment) and/or DCI for indicating a CSI trigger without scheduling data (DCI for CSI trigger) can be used.

When both of the DCI for data scheduling and the DCI for CSI trigger are supported, an identification field may be provided in each of the pieces of DCI in order to distinguish the DCI for data scheduling and the DCI for CSI trigger.

(Radio Communication System)

Hereinafter, a structure of a radio communication system according to one embodiment of the present invention will be described. In this radio communication system, the radio communication method according to each embodiment of the present invention described above may be used alone or may be used in combination for communication.

Figure 5:
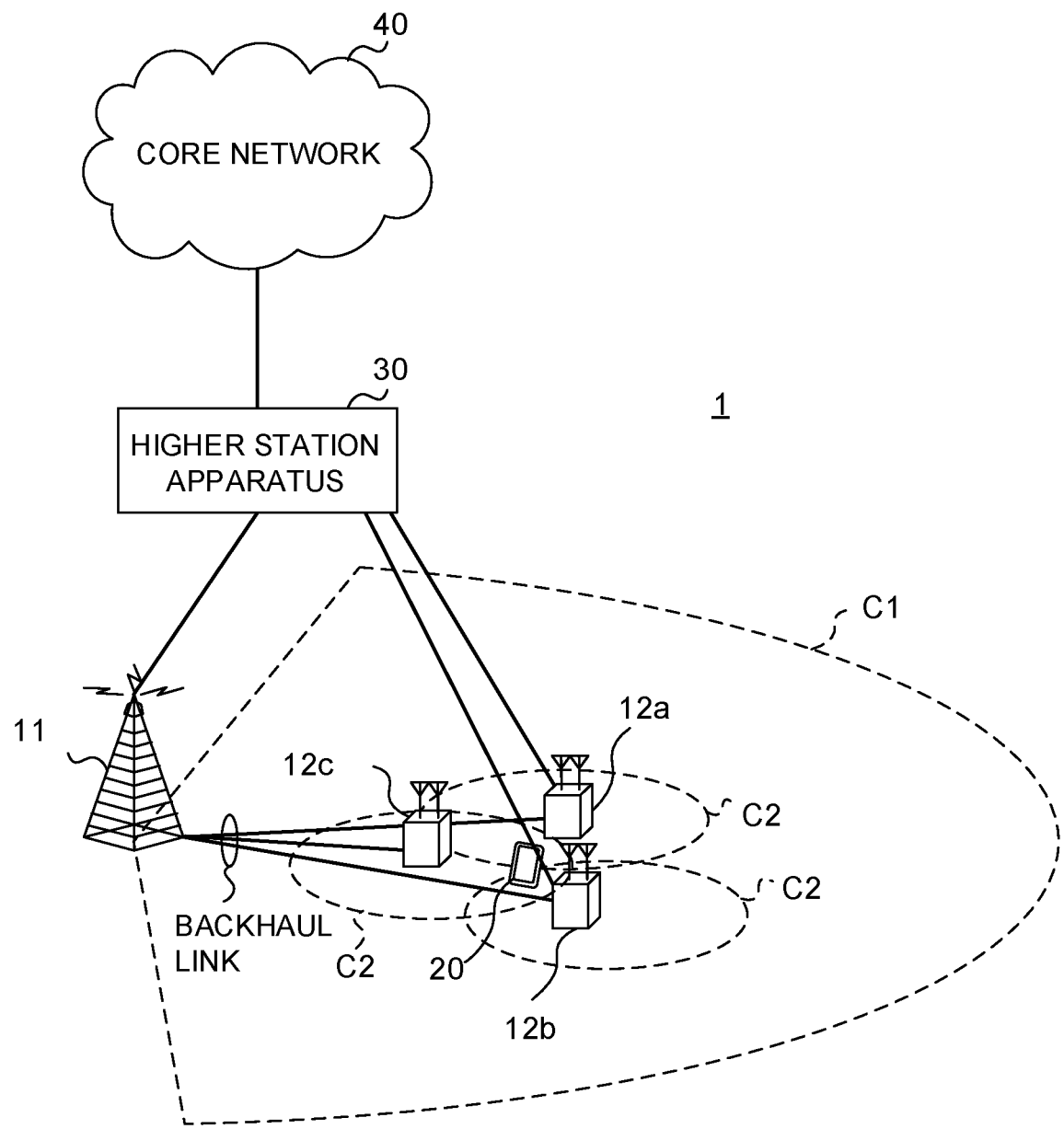
FIG. 5 is a diagram to show an example of a schematic structure of a radio communication system according to one embodiment of the present invention.

FIG. 5 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)," "NR (New Radio)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement of each cell and user terminal 20 is by no means limited to the arrangement shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 may adopt CA or DC by using a plurality of cells (CCs) (for example, five or less CCs, or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

A wired connection (for example, an optical fiber in compliance with the CPRI (Common Public Radio Interface), an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, different numerologies may be applied within a cell and/or among cells. Note that the numerology refers to, for example, communication parameters (for example, a subcarrier spacing, a bandwidth, and so on) applied to transmission and reception of a certain signal.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are transmitted on the PDSCH. The MIBs (Master Information Blocks) are transmitted on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and PUSCH scheduling information, and so on are transmitted on the PDCCH. The number of OFDM symbols to use for the PDCCH is transmitted on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to transmit DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are transmitted on the PUSCH. Further, downlink radio quality information (CQI (Channel Quality Indicator)), transmission confirmation information, and so on are transmitted on the PUCCH. By means of the PRACH, random access preambles for establishing connections with cells are transmitted.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 6:
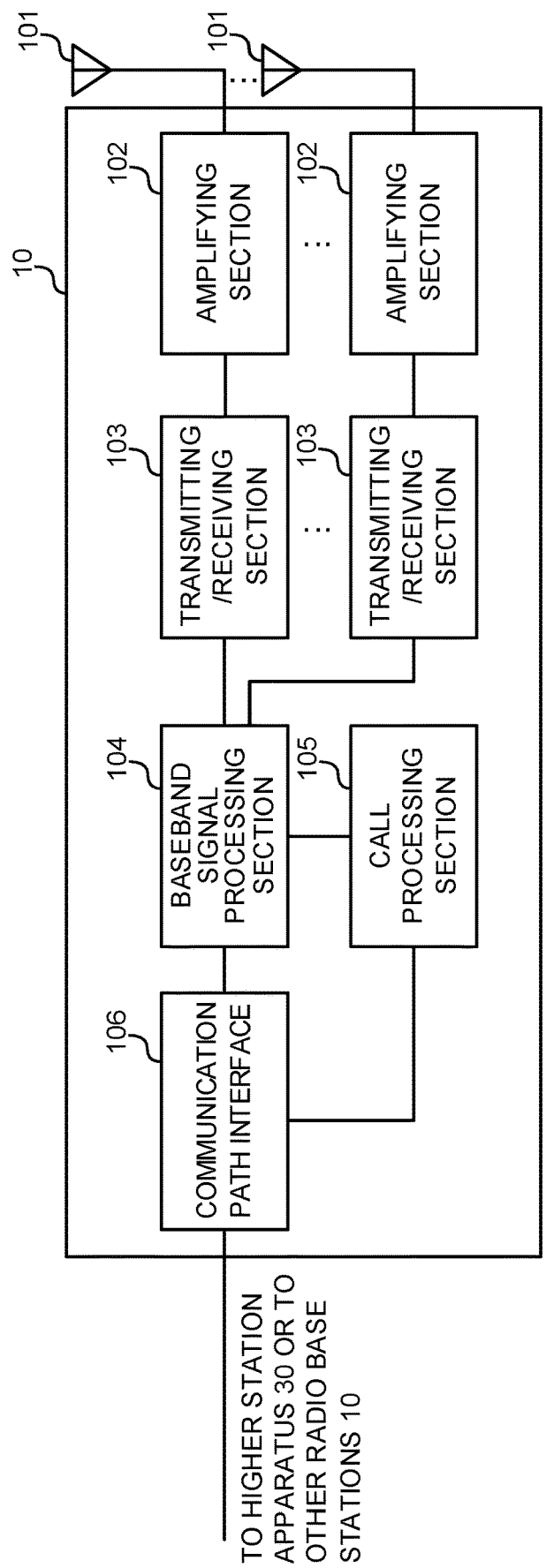
FIG. 6 is a diagram to show an example of an overall structure of a radio base station according to one embodiment of the present invention.

FIG. 6 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 transmit downlink control information for indicating a trigger and/or activation of channel state information. In this case, the transmitting/receiving sections 103 transmit downlink control information including information related to an uplink channel to be used for reporting of the channel state information. Further, the transmitting/receiving sections 103 receive channel state information transmitted from the UE on a certain uplink channel.

Figure 7:
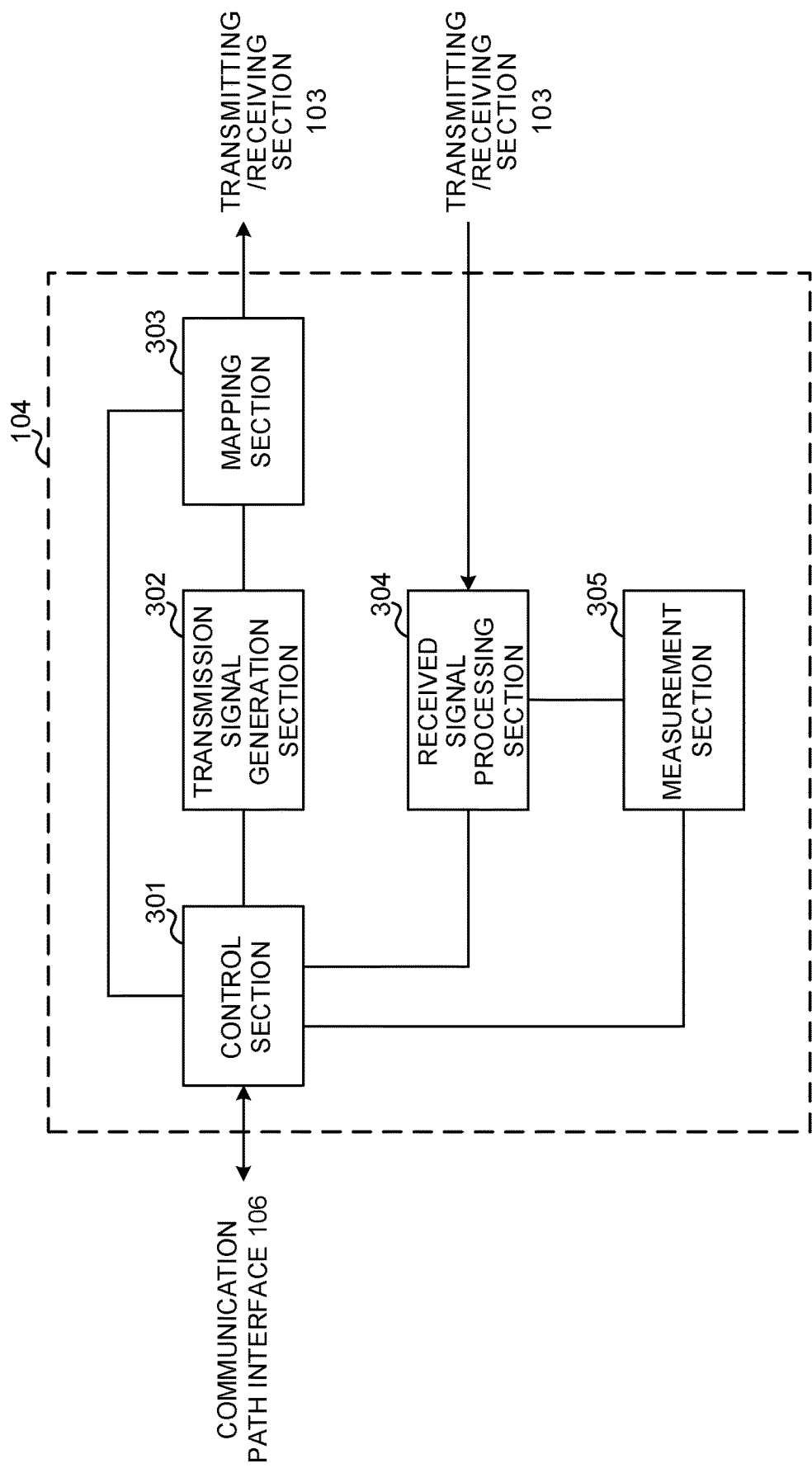
FIG. 7 is a diagram to show an example of a functional structure of the radio base station according to one embodiment of the present invention.

FIG. 7 is a diagram to show an example of a functional structure of the radio base station according to one embodiment of the present invention. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present invention pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls scheduling (for example, resource allocation) of system information, a downlink data signal (for example, a signal transmitted on a PDSCH), and a downlink control signal (for example, a signal transmitted on a PDCCH, an EPDCCH, or an NR-PDCCH). Based on the results of determining necessity or not of retransmission control to the uplink data signal, or the like, the control section 301 controls generation of a downlink control signal (for example, transmission confirmation information and so on), a downlink data signal, and so on. The control section 301 controls the scheduling of a synchronization signal (for example, a PSS (Primary Synchronization Signal)/an SSS (Secondary Synchronization Signal)), a downlink reference signal (for example, a CRS, a CSI-RS, a DMRS), and so on.

The control section 301 controls scheduling of an uplink data signal (for example, a signal transmitted on a PUSCH), an uplink control signal (for example, a signal transmitted on a PUCCH and/or a PUSCH), a random access preamble transmitted on a PRACH, an uplink reference signal, and so on.

The control section 301 controls transmission of downlink control information for indicating a trigger and/or activation of channel state information. Further, the control section 301 controls generation of certain downlink control information (DCI for CSI trigger) for indicating an uplink channel to be used for reporting of the channel state information. In order to indicate an uplink channel to be used for CSI reporting, the control section 301 performs control to generate DCI including a field for UL channel identification, apply an RNTI associated with the uplink channel, or change a DCI size based on the uplink channel.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present invention pertains.

For example, the transmission signal generation section 302 generates a DL assignment to report assignment information of a downlink signal and a UL grant to report assignment information of an uplink signal, based on commands from the control section 301. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to the certain radio resources described above, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

The measurement section 305 may measure, for example, received signal received power (for example, RSRP (Reference Signal Received Power)), received quality (for example, RSRQ (Reference Signal Received Quality) and an SINR (Signal to Interference plus Noise Ratio)), uplink channel information (for example, CSI), and so on. The measurement results may be output to the control section 301.

(User Terminal)

Figure 8:
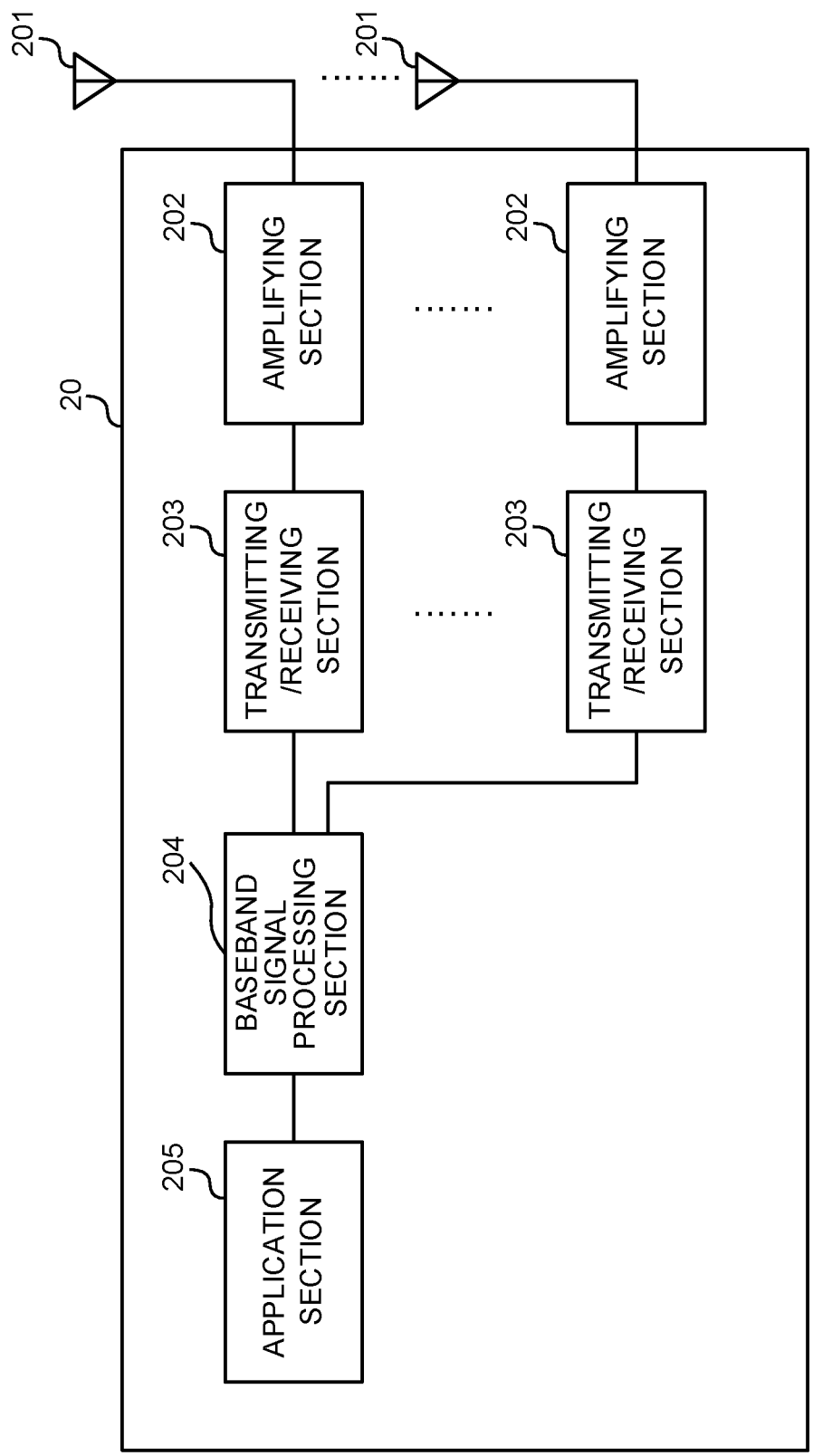
FIG. 8 is a diagram to show an example of an overall structure of a user terminal according to one embodiment of the present invention.

FIG. 8 is a diagram to show an example of an overall structure of the user terminal according to one embodiment of the present invention. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 receive downlink control information for indicating a trigger and/or activation of channel state information. In this case, the transmitting/receiving sections 203 receive downlink control information including information related to an uplink channel to be used for reporting of the channel state information. Further, the transmitting/receiving sections 203 transmit channel state information on a certain uplink channel.

Figure 9:
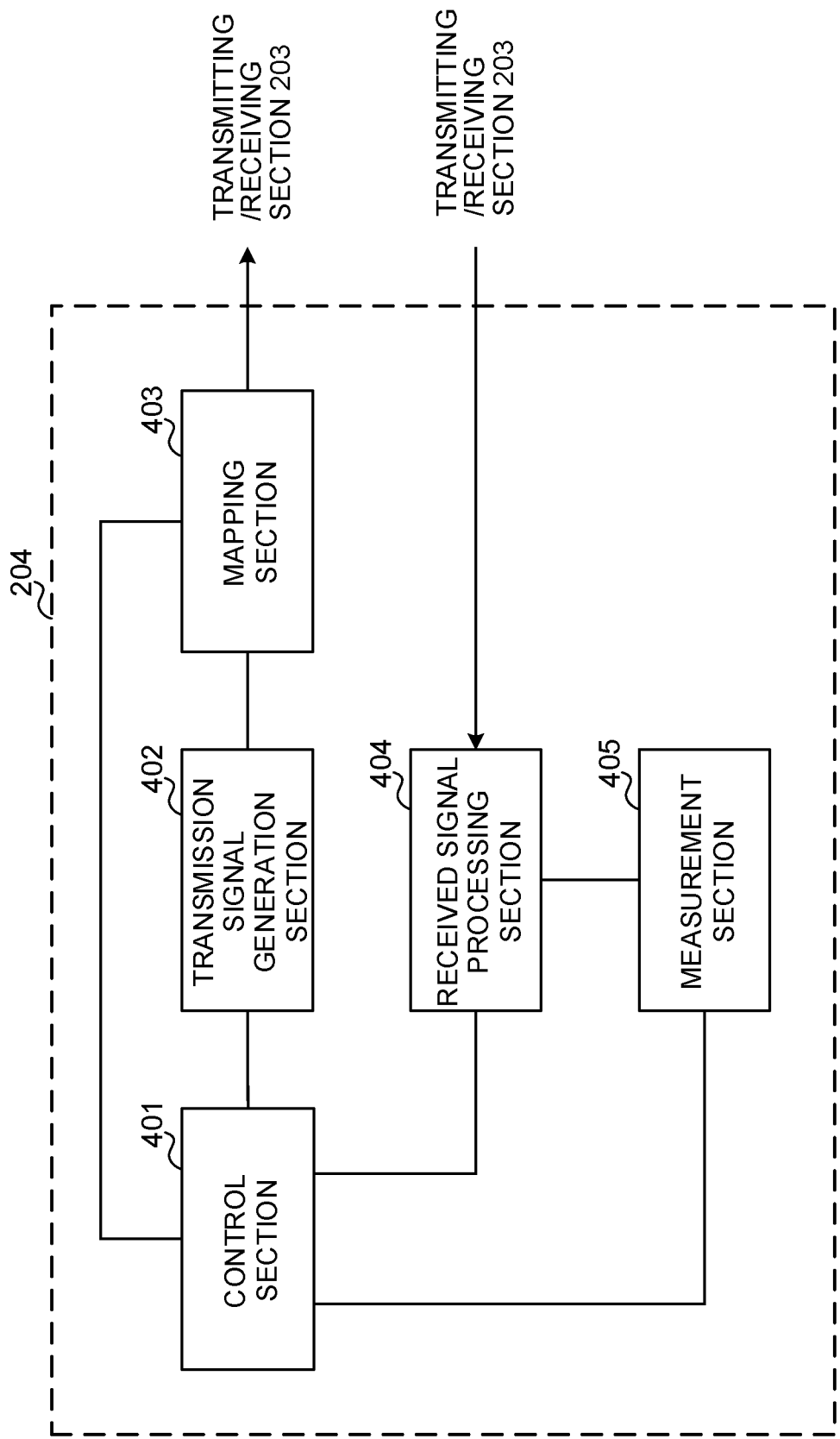
FIG. 9 is a diagram to show an example of a functional structure of the user terminal according to one embodiment of the present invention.

FIG. 9 is a diagram to show an example of a functional structure of the user terminal according to one embodiment of the present invention. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires, from the received signal processing section 404, a downlink control signal (for example, a signal transmitted on the NR-PDCCH) and a downlink data signal (for example, a signal transmitted on the PDSCH) that are transmitted from the radio base station 10. The control section 401 controls generation of an uplink control signal (for example, transmission confirmation information and so on) and/or an uplink data signal, based on the results of determining necessity or not of retransmission control to a downlink control signal and/or a downlink data signal.

The control section 401 controls reception of downlink control information for indicating a trigger and/or activation of channel state information. Further, the control section 401 performs control to determine an uplink channel to be used for transmission of channel state information, based on the downlink control information.

For example, the control section 401 may determine an uplink channel to be used for transmission of channel state information, based on at least one of a 1-bit bit field included in the downlink control information, an RNTI applied to the downlink control information, and the size of the downlink control information.

Further, the control section 401 may control an uplink channel for performing power control command accumulation, based on the uplink channel used for transmission of the channel state information. Further, the control section 401 may apply a resource allocation field included in the downlink control information to the uplink channel determined based on the downlink control information.

Further, the control section 401 may simultaneously receive a plurality of pieces of downlink control information for indicating a trigger and/or activation of channel state information using the same or different uplink channel(s).

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present invention pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. For example, the measurement section 405 conducts measurement by using a downlink reference signal transmitted from the radio base station 10. The measurement section 405 can be constituted with a measurer, a measurement circuit or measurement apparatus that can be described based on general understanding of the technical field to which the present invention pertains.

For example, the measurement section 405 may measure received signal received power (for example, RSRP), a received quality (for example, RSRQ, received SINR), downlink channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 10:
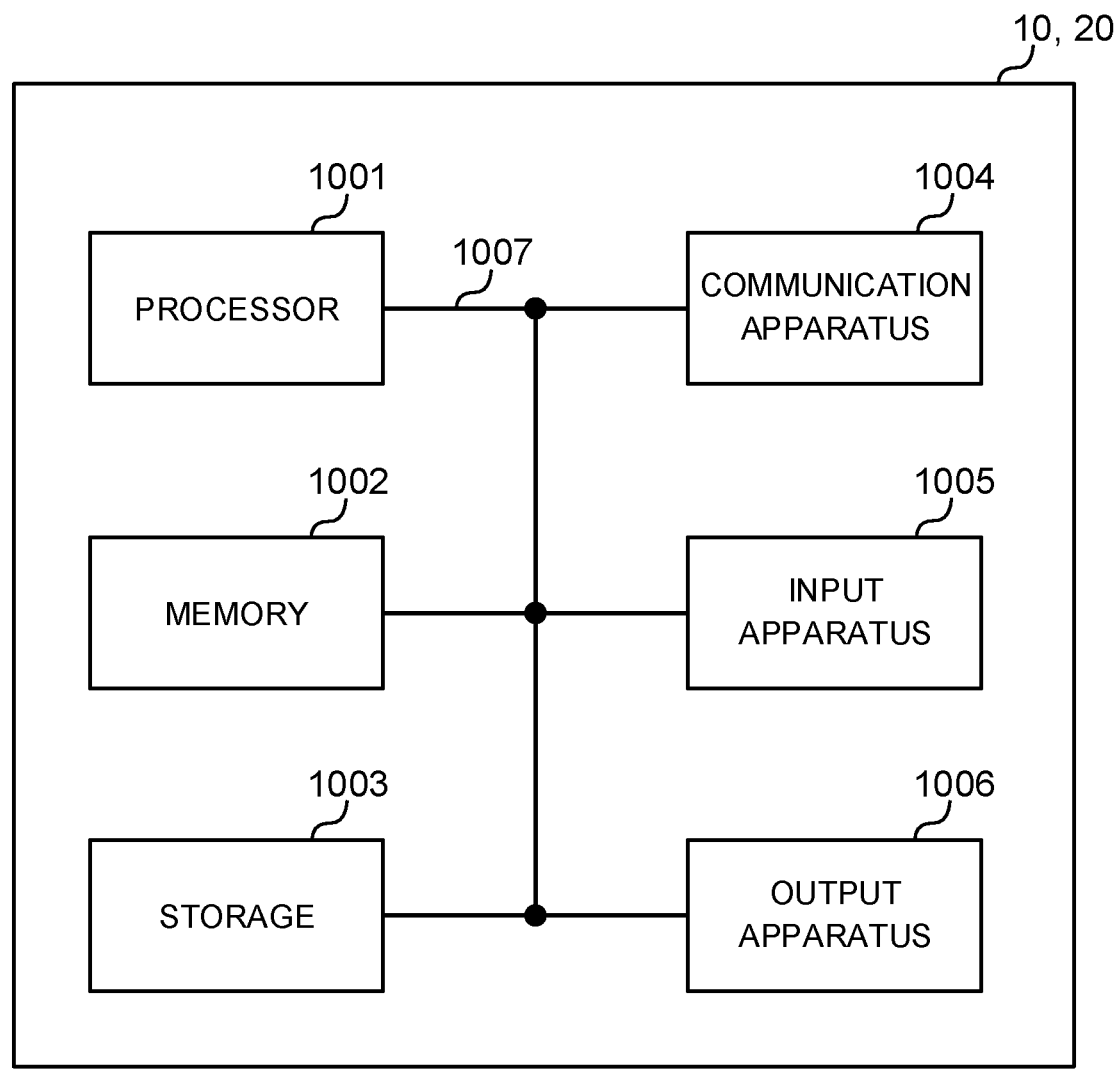
FIG. 10 is a diagram to show an example of a hardware structure of the radio base station and the user terminal according to one embodiment of the present invention.

For example, a radio base station, a user terminal, and so on according to one embodiment of the present invention may function as a computer that executes the processes of the radio communication method of the present invention. FIG. 10 is a diagram to show an example of a hardware structure of the radio base station and the user terminal according to one embodiment of the present invention. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via a wired and/or wireless network, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on).

Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in this specification and/or the terminology that is needed to understand this specification may be replaced by other terms that convey the same or similar meanings. For example, "channels" and/or "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks, and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices. Further, mathematical formulas using these parameters and so on may be different from those explicitly disclosed in this specification.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be performed explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" used in this specification can be used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Specific actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up, (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access." When being used in this specification, two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

(Supplementary Note)

Supplementary notes on the present disclosure are described below.

The present disclosure relates to control of a UL channel (or a resource) to be used for transmission of aperiodic CSI (A-CSI) when aperiodic CSI reporting (A-CSI reporting) is triggered using downlink control information (DCI). For example, when CSI is triggered using DCI, 1 bit indicating whether the CSI is transmitted on an uplink shared channel (for example, a PUSCH) or transmitted on an uplink control channel (for example, an sPUCCH) is included in the DCI.

For example, whether the aperiodic CSI is transmitted on the PUSCH or the short PUCCH (sPUCCH) can be determined based on at least one of a bit field of a certain bit (for example, 1 bit) included in the DCI (for example, a UL grant), an RNTI applied to the DCI, the size of the DCI (for example, a DCI payload length).

TPC command accumulation may be controlled based on whether the aperiodic CSI is transmitted on the PUSCH or the short PUCCH. For example, the UE controls TPC command accumulation for the PUSCH and TPC command accumulation for the PUCCH, based on whether the aperiodic CSI is transmitted on the PUSCH or the short PUCCH.

Interpretation of a resource allocation field (RA field) included in the DCI may be determined, based on whether the aperiodic CSI is transmitted on the PUSCH or the short PUCCH. For example, when CSI transmission using the PUSCH is indicated, the UE applies the RA field to the PUSCH. Otherwise (for example, when CSI transmission using the PUCCH is indicated), the UE may apply the RA field to the short PUCCH.

The UE may simultaneously receive a plurality of A-CSI triggers in the same serving cell. In this case, one of the plurality of triggers may be an A-CSI trigger using the PUSCH, and the other triggers may be A-CSI triggers using the short PUCCH. Further, the plurality of A-CSI triggers may be individually notified using a plurality of different pieces of DCI, or may be notified using one piece of DCI.

Supplementary notes about examples of structures of the present disclosure are described below. Note that the present invention is not limited to the structures described below.

[Structure 1]

A user terminal including:
  a receiving section that receives downlink control information indicating a trigger and/or activation of channel state information; and
  a control section that determines an uplink channel to be used for transmission of the channel state information, based on the downlink control information.

[Structure 2]

The user terminal according to structure 2, wherein
  the control section determines the uplink channel to be used for transmission of the channel state information, based on at least one of a 1-bit bit field included in the downlink control information, an RNTI applied to the downlink control information, and a size of the downlink control information.

[Structure 3]

The user terminal according to structure 1 or 2, wherein
  the control section controls an uplink channel for performing power control command accumulation, based on the uplink channel used for transmission of the channel state information.

[Structure 4]

The user terminal according to any one of structures 1 to 3, wherein
  the control section applies a resource allocation field included in the downlink control information to the uplink channel determined based on the downlink control information.

[Structure 5]

The user terminal according to any one of structures 1 to 4, wherein
  the receiving section simultaneously receives a plurality of pieces of downlink control information indicating a trigger and/or activation of channel state information using same or different uplink channel(s).

[Structure 6]

A radio communication method for a user terminal, the radio communication method including:
  receiving downlink control information indicating a trigger and/or activation of channel state information; and
  determining an uplink channel to be used for transmission of the channel state information, based on the downlink control information.

The present application is based on Japanese Patent Application No. 2017-239055, filed on Nov. 27, 2017. The contents of the application are incorporated herein by reference.

What is claimed is:

1. A terminal comprising:
  a receiver that receives downlink control information indicating activation or deactivation of semi-persistent channel state information; and
  a processor that controls transmission of the semi-persistent channel state information by making an interpretation of a certain bit field included in the downlink control information based on a Radio Network Temporary Identifier (RNTI) applied to a Cyclic Redundancy Check (CRC) of the downlink control information,
  wherein the processor changes the interpretation of the certain bit field included in the downlink control information when a certain RNTI is applied to the CRC of the downlink control information.

2. The terminal according to claim 1, wherein the certain bit field includes a resource allocation field.

3. A communication method comprising:
  receiving downlink control information indicating activation or deactivation of semi-persistent channel state information; and
  controlling transmission of the semi-persistent channel state information by making an interpretation of a certain bit field included in the downlink control information based on a Radio Network Temporary Identifier (RNTI) applied to a Cyclic Redundancy Check (CRC) of the downlink control information,
  wherein the interpretation of the certain bit field included in the downlink control information changes when a certain RNTI is applied to the CRC of the downlink control information.

4. A base station comprising:
- a transmitter that transmits, to a terminal, downlink control information indicating activation or deactivation of semi-persistent channel state information; and
- a processor that controls reception of the semi-persistent channel state information, transmitted from the terminal, according to an interpretation of a certain bit field included in the downlink control information based on an RNTI applied to a CRC of the downlink control information,
- wherein the interpretation of the certain bit field included in the downlink control information is changed when a certain RNTI is applied to the CRC of the downlink control information.

5. A system comprising a terminal and a base station, wherein:
- the terminal comprises:
  - a receiver that receives downlink control information indicating activation or deactivation of semi-persistent channel state information; and
  - a processor that controls transmission of the semi-persistent channel state information by making an interpretation of a certain bit field included in the downlink control information based on a Radio Network Temporary Identifier (RNTI) applied to a Cyclic Redundancy Check (CRC) of the downlink control information; and
- the base station comprises:
  - a transmitter that transmits the downlink control information,
  - wherein the processor changes the interpretation of the certain bit field included in the downlink control information when a certain RNTI is applied to the CRC of the downlink control information.

* * * * *